(12) United States Patent
Jin et al.

(10) Patent No.: US 10,696,032 B2
(45) Date of Patent: Jun. 30, 2020

(54) BONDING METHOD USING A CARBON NANOTUBE STRUCTURE

(71) Applicants: Tsinghua University, Beijing (CN); HON HAI PRECISION INDUSTRY CO., LTD., New Taipei (TW)

(72) Inventors: Xiang Jin, Beijing (CN); Zi-Peng Wu, Beijing (CN); Wen-Tao Miao, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 110 days.

(21) Appl. No.: 16/119,700

(22) Filed: Aug. 31, 2018

(65) Prior Publication Data

US 2019/0202190 A1 Jul. 4, 2019

(30) Foreign Application Priority Data

Dec. 28, 2017 (CN) .......................... 2017 1 1465821

(51) Int. Cl.
*B29C 65/00* (2006.01)
*B32B 37/12* (2006.01)
(Continued)

(52) U.S. Cl.
CPC ............... *B32B 37/12* (2013.01); *B32B 5/16* (2013.01); *B32B 7/03* (2019.01); *B32B 9/04* (2013.01);
(Continued)

(58) Field of Classification Search
CPC ..... B29C 65/02; B29C 65/50; B29C 65/5007; B29C 65/5028; B29C 65/76;
(Continued)

(56) References Cited

U.S. PATENT DOCUMENTS 7,932,123 B2 * 4/2011 Rogers ................. B81C 1/0046
438/73
2009/0028779 A1 * 1/2009 Wang ..................... B82Y 30/00
423/461

(Continued)

FOREIGN PATENT DOCUMENTS

| JP | 2004-26950 | 1/2004 |
| JP | 2010-285344 | 12/2010 |
| JP | 2011-88212 | 5/2011 |

OTHER PUBLICATIONS

Ke Wang et al., Super-aligned carbon nanotube films as current collectors for lightweight and flexible lithium ion batteries, Advanced Functional Materials, 2013, 846-853, vol. 23.

(Continued)

*Primary Examiner* — Mark A Osele
*Assistant Examiner* — Nickolas R Harm
(74) *Attorney, Agent, or Firm* — ScienBiziP, P.C.

(57) ABSTRACT

A bonding method utilizing carbon nanotubes provides first and second objects to be bonded and a carbon nanotube structure. The carbon nanotube structure comprises a super-aligned carbon nanotube film comprising carbon nanotubes, the carbon nanotubes extending substantially along a same direction. The carbon nanotube structure is laid on surface of first object and surface of second object is pressed onto the carbon nanotube structure. Pressure being applied to the first object and the second object bonds the two together.

20 Claims, 10 Drawing Sheets

(51) Int. Cl.
  *B32B 5/16* (2006.01)
  *B32B 9/04* (2006.01)
  *C09J 7/38* (2018.01)
  *C09J 5/00* (2006.01)
  *B32B 7/03* (2019.01)
  *C08J 5/12* (2006.01)
  *B82Y 30/00* (2011.01)
  *B82Y 40/00* (2011.01)
  *B29C 65/02* (2006.01)
  *B29C 65/50* (2006.01)
  *B29C 65/76* (2006.01)
  *B32B 7/035* (2019.01)

(52) U.S. Cl.
  CPC . *C08J 5/12* (2013.01); *C09J 5/00* (2013.01); *C09J 7/38* (2018.01); *B29C 65/02* (2013.01); *B29C 65/50* (2013.01); *B29C 65/5007* (2013.01); *B29C 65/5028* (2013.01); *B29C 65/76* (2013.01); *B29C 66/0344* (2013.01); *B29C 66/303* (2013.01); *B29C 66/344* (2013.01); *B29C 66/721* (2013.01); *B29C 66/73711* (2013.01); *B29C 66/73712* (2013.01); *B32B 7/035* (2019.01); *B32B 2250/05* (2013.01); *B32B 2264/10* (2013.01); *B32B 2405/00* (2013.01); *B82Y 30/00* (2013.01); *B82Y 40/00* (2013.01); *C08J 2467/02* (2013.01); *C09J 2400/10* (2013.01)

(58) Field of Classification Search
  CPC . B29C 66/0344; B29C 66/303; B29C 66/344; B29C 66/721; B29C 66/73711; B29C 66/73712; B32B 7/03; B32B 7/035; B32B 5/16; B32B 9/04; C08J 5/12
  See application file for complete search history.

(56) References Cited

U.S. PATENT DOCUMENTS

| | | | |
|---|---|---|---|
| 2010/0196249 A1* | 8/2010 | Hata | B82Y 30/00 423/447.2 |
| 2010/0310809 A1* | 12/2010 | Jiang | B32B 7/06 428/41.8 |
| 2011/0094671 A1 | 4/2011 | Wang et al. | |
| 2011/0134058 A1* | 6/2011 | Liu | B82Y 30/00 345/173 |
| 2011/0171419 A1* | 7/2011 | Li | B82Y 10/00 428/113 |
| 2011/0253669 A1* | 10/2011 | Liu | B32B 5/12 216/36 |
| 2012/0103509 A1* | 5/2012 | Wang | B29C 65/3612 156/272.2 |
| 2014/0140549 A1* | 5/2014 | Wei | H04R 23/002 381/164 |
| 2014/0209235 A1* | 7/2014 | Qian | B32B 37/0038 156/242 |
| 2016/0351933 A1* | 12/2016 | Zhang | H01M 8/1006 |
| 2017/0147108 A1* | 5/2017 | Fan | B60K 35/00 |
| 2017/0313589 A1* | 11/2017 | Wang | C01B 32/168 |
| 2018/0239184 A1* | 8/2018 | Hirakata | B29C 63/42 |

OTHER PUBLICATIONS

Ming Xu et al., enhanced adhesion over a large temperature range, Nature Communications, vol. 7, 2016, page: entire document.
Bingan Chen et al., Influence of Packing Density and Surface Roughness of Vertically-aligned Carbon Nanotubes on Adhesive Properties of Gecko-inspired Mimetics, ACS applied materials & interfaces, Jan. 22, 2015, 3626-3632, vol. 7, No. 6.

* cited by examiner

BONDING METHOD USING A CARBON NANOTUBE STRUCTURE

CROSS-REFERENCE TO RELATED APPLICATIONS

This application claims all benefits accruing under 35 U.S.C. § 119 from China Patent Application No. 201711465821.2, filed on Dec. 28, 2017, in the China Intellectual Property Office, the contents of which are hereby incorporated by reference. The application is also related to copending applications entitled, "DOUBLE-SIDED TAPE WITH EXTENDED TEMPERATURE RANGE", filed Aug. 31, 2018 Ser. No. 16/119,635 US72473). The application is also related to copending applications entitled, "BONDING METHOD OF FIXING AN OBJECT TO A ROUGH SURFACE", filed Sep. 27, 2018 Ser. No. 16/143,508.

FIELD

The present disclosure relates to a bonding method, and more particularly, relates to a bonding method using a carbon nanotube structure.

BACKGROUND

In conventional bonding methods, double-sided tape or adhesive is used for bonding and fixing objects. However, an application temperature range of conventional bonding methods is narrow, viscosity of the double-sided tape or adhesive used in conventional bonding methods is significantly reduced or even lost at high temperatures or at low temperatures.

BRIEF DESCRIPTION OF THE DRAWINGS

Implementations of the present technology will now be described, by way of example only, with reference to the attached figures, wherein.

DETAILED DESCRIPTION

Figure 1:
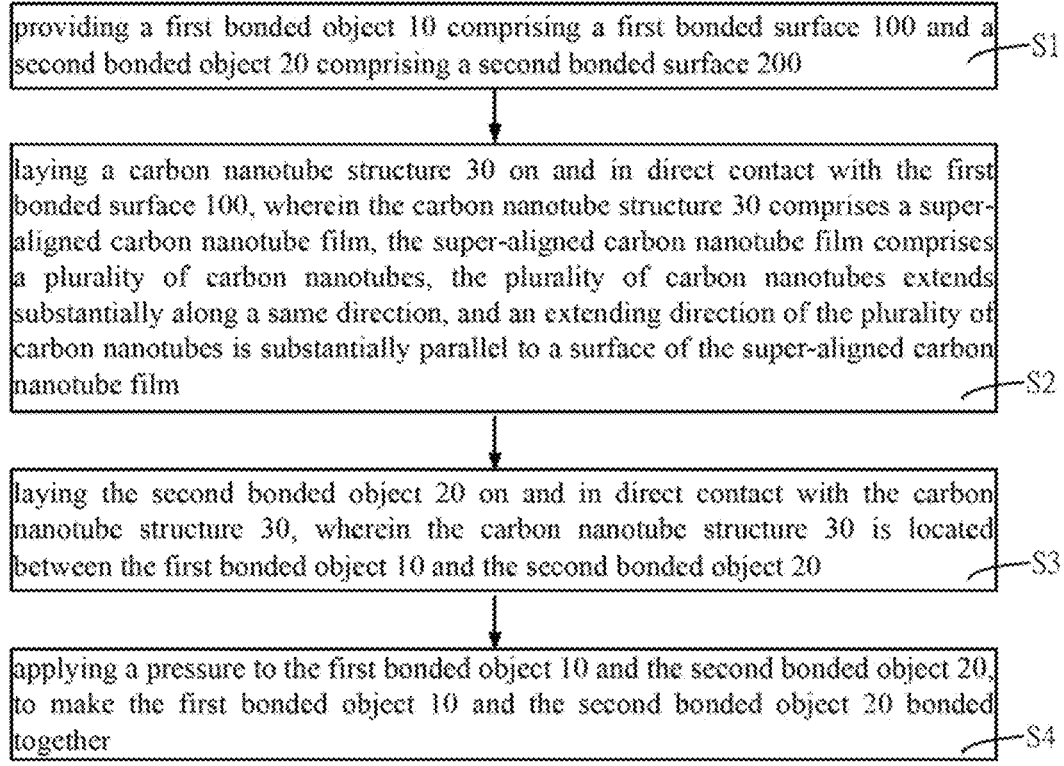
FIG. 1 is a flow diagram of one embodiment of a bonding method.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

Figure 2:
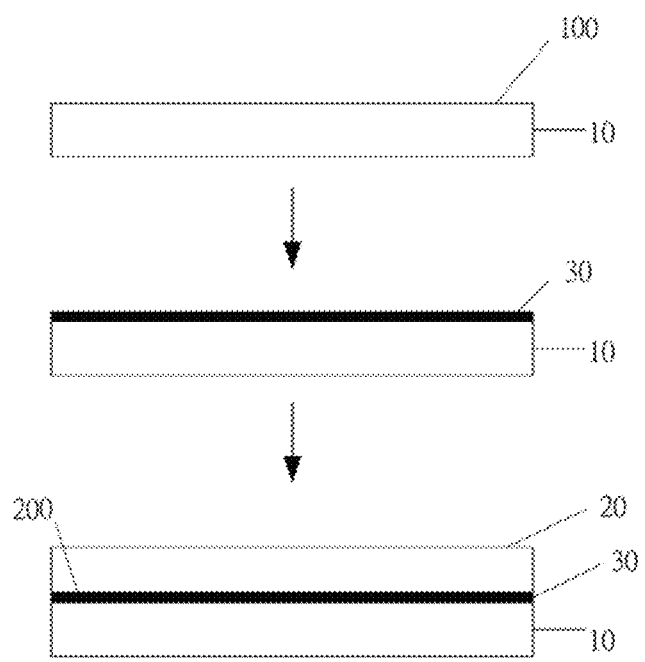
FIG. 2 is a schematic view of the bonding method in FIG. 1.

Referring to FIG. 1 and FIG. 2, one embodiment is described in relation to a bonding method. The bonding method comprises steps of:

step (S1), providing a first object 10 comprising a first surface 100 and a second object 20 comprising a second surface 200;

step (S2), laying a carbon nanotube structure 30 on and in direct contact with the first surface 100, wherein the carbon nanotube structure 30 comprises a super-aligned carbon nanotube film. The super-aligned carbon nanotube film comprises a plurality of carbon nanotubes, each of the plurality of carbon nanotubes extends substantially along a same direction, and an extending direction is substantially parallel to a surface of the super-aligned carbon nanotube film, the first surface, and the second surface;

step (S3), laying the second object 20 on and in direct contact with the carbon nanotube structure 30, wherein the carbon nanotube structure 30 is located between the first object 10 and the second object 20; and step (S4), applying a pressure to the first object 10 and the second object 20, to make the first object 10 and the second object 20 bonded together and form a three-layer structure.

In step (S1), the material and the shape of the first object 10 and the second object 20 are not limited. Examples of the shape of the first object 10 and the second object 20 comprise cube, cuboid, cone, and cylinder. Examples of the material of the first object 10 and the second object 20 can comprise glass, quartz, silicon, and polyethylene (PET). Both the first surface 100 and the second surface 200 can be a flat surface or a curved surface. The shape of the second object 20 and the shape of the first object 10 can be the same or different. The material of the second object 20 and the material of the first object 10 can be the same or different.

In one embodiment, both the first object 10 and the second object 20 are square silicon wafers having a side length of 7 mm.

The carbon nanotube structure 30 bonds with the first surface 100 and the second surface 200 only by van der Waals force. If the first surface 100 and the second surface 200 are too rough, such as the surface roughness of the first surface 100 and the second surface 200 being larger than 1.0 micrometer, or the first surface 100 and the second surface 200 being contaminated and not clean, then the van der Waals force between the carbon nanotube structure 30 and the first surface 100 and the van der Waals force between the carbon nanotube structure 30 and the second surface 200 is decreased. The adhesion between the carbon nanotube structure 30 and the first surface 100 and the adhesion between the carbon nanotube structure 30 and the second surface 200 thus decreases. In all embodiments, the first surface 100 and the second surface 200 are clean and smooth surfaces. The phrase "clean and smooth surfaces" refers the surfaces being substantially free of impurities, dust and the like, and having a small surface roughness. In one embodiment, both the first surface 100 and the second surface 200 have the surface roughness less than or equal to 1.0 micrometer. In one embodiment, both the first surface 100 and the second surface 200 have the surface roughness less than or equal to 500 nanometers. In one embodiment, both the first surface 100 and the second surface 200 have the surface roughness less than or equal to 100 nanometers. When the first surface 100 and the second surface 200 are clean surfaces and the surface roughness is less than or equal to 1.0 micrometer, the van der Waals force between the carbon nanotube structure 30 and the first surface 100 and the van der Waals force between the carbon nanotube structure 30 and the second surface 200 are large, therefore, there is greater adhesion between the carbon nanotube structure 30 and the first surface 100 and between the carbon nanotube structure 30 and the second surface 200.

Figure 3:
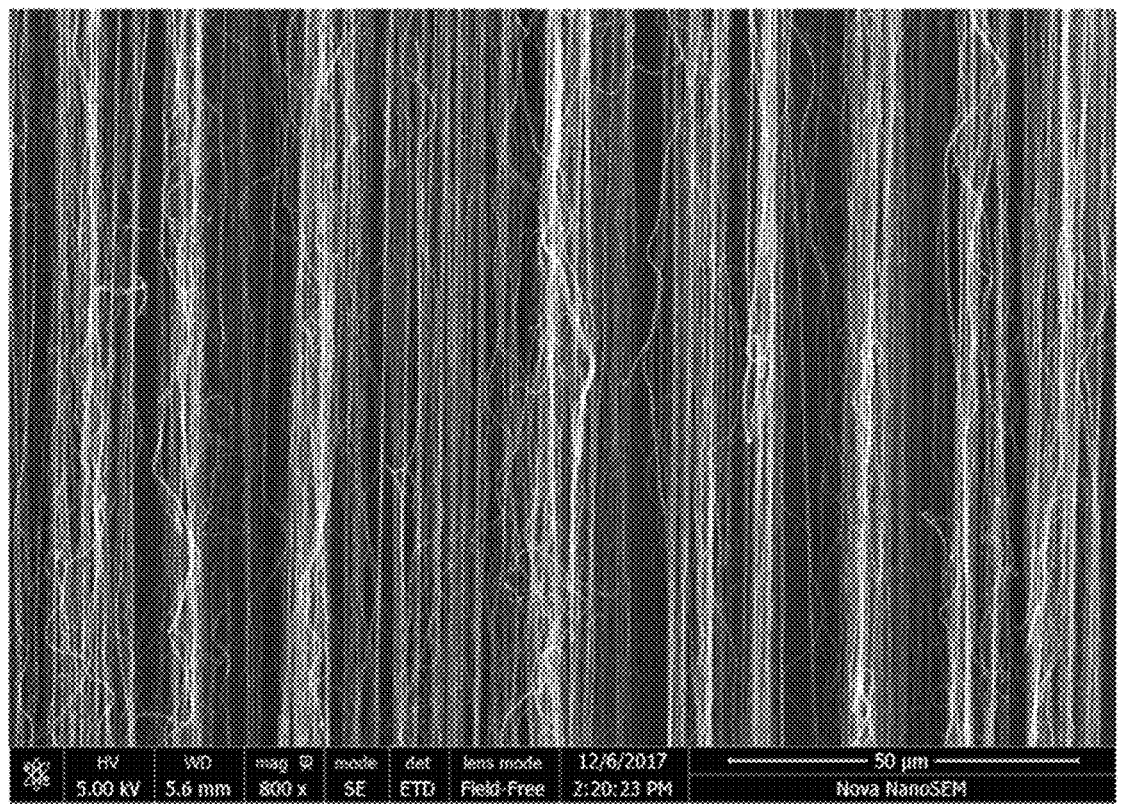
FIG. 3 shows a scanning electron microscope (SEM) image of one embodiment of a super-aligned carbon nanotube film.

In step (S2), referring to FIG. 3, the plurality of carbon nanotubes extending substantially along the same direction refers to a majority of the carbon nanotubes of the super-aligned carbon nanotube film extending along the same direction, a minority of carbon nanotubes may be randomly aligned. However, the number of randomly aligned carbon nanotubes is very small and does not affect the overall oriented alignment of the majority of carbon nanotubes of the super-aligned carbon nanotube film. The randomly aligned carbon nanotubes are of no significance and can be ignored. The plurality of carbon nanotubes of the super-aligned carbon nanotube film are joined end-to-end by van der Waals force. Adjacent carbon nanotubes along the extending direction are joined end-to-end by van der Waals force.

In one embodiment, the plurality of carbon nanotubes is pure carbon nanotubes. The pure carbon nanotubes mean that the carbon nanotubes are not modified by physical or chemical methods, there are few or no impurities adhered on surfaces of the carbon nanotubes, and a purity of the carbon nanotubes is better than or equal to 99.9%. Therefore, the bonding method has substantially no environmental effects. Since the plurality of carbon nanotubes is pure carbon nanotubes, and a specific surface area of each of the plurality of carbon nanotube is very large, the super-aligned carbon nanotube film has strong viscosity. The carbon nanotube structure 30 thus has strong viscosity, therefore, the first object 10 and the second object 30 can be strongly bonded together by the bonding method.

The super-aligned carbon nanotube film is a free-standing film. The term 'free-standing' means films that do not have to be supported by a substrate, and can be self-supporting to maintain a film shape. Therefore, the carbon nanotube structure 30 comprising the super-aligned carbon nanotube film can be directly laid on the first surface 100.

Figure 4:
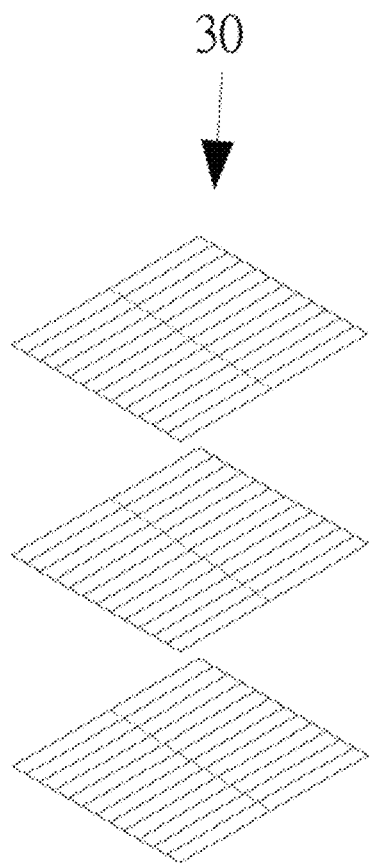
FIG. 4 is a structure schematic view of one embodiment of a carbon nanotube structure including at least two super-aligned carbon nanotube films.
Figure 5:
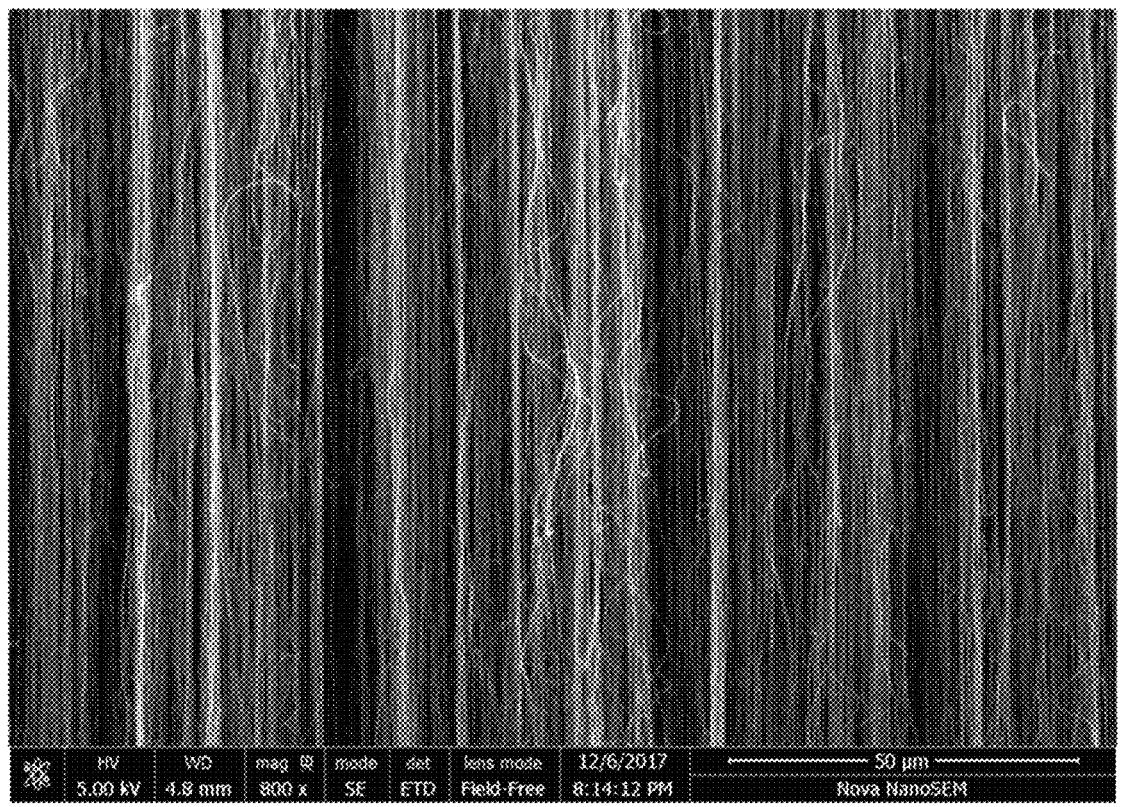
FIG. 5 shows a scanning electron microscope (SEM) image of one embodiment of a carbon nanotube structure including 8 layers of super-aligned carbon nanotube films.
Figure 6:
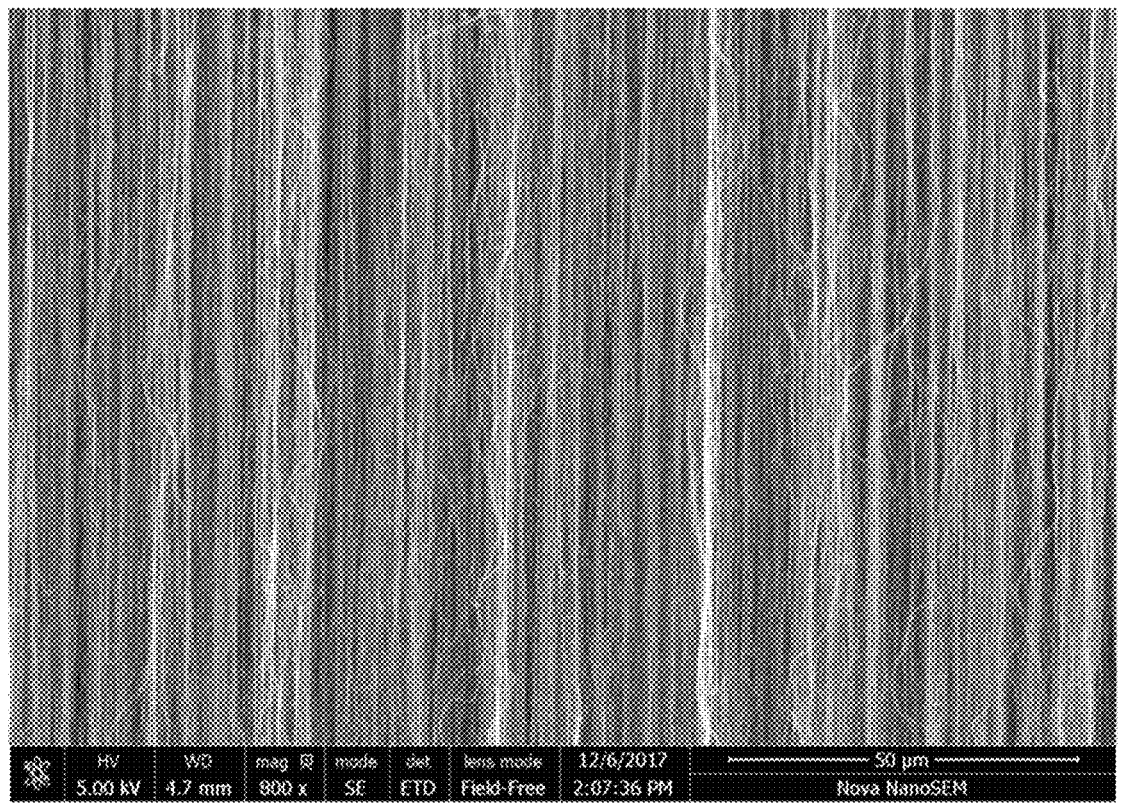
FIG. 6 shows a scanning electron microscope (SEM) image of one embodiment of a carbon nanotube structure including 50 layers of super-aligned carbon nanotube films.

Referring to FIGS. 4-6, in one embodiment, the carbon nanotube structure 30 comprises at least two super-aligned carbon nanotube films, the at least two super-aligned carbon nanotube films are overlapped and parallel to each other. Adjacent super-aligned carbon nanotube films are closely joined by van der Waals force. The extending directions of the plurality of carbon nanotubes of the at least two super-aligned carbon nanotube films are substantially the same. "Substantially the same" refers a majority of the carbon nanotubes of the at least two super-aligned carbon nanotube film extending along the same direction, only a minority of carbon nanotubes may be randomly aligned. The randomly aligned carbon nanotubes do not affect the overall extending direction of most of the carbon nanotubes of the super-aligned carbon nanotube film, and can be ignored.

In one embodiment, the carbon nanotube structure 30 consists of one super-aligned carbon nanotube film. The method of laying the carbon nanotube structure 30 on and in direct connect with the first surface 100 comprises step (S21), providing a super-aligned carbon nanotube array and step (S22), drawing the super-aligned carbon nanotube film from the super-aligned carbon nanotube array, and directly laying the super-aligned carbon nanotube film on the first surface 100 without any other steps of treating the super-aligned carbon nanotube film. For example, after drawing the super-aligned carbon nanotube film from the super-aligned carbon nanotube array and before laying the super-aligned carbon nanotube film on the first surface 100, the super-aligned carbon nanotube film is not chemically or physically treated.

The step (S22) comprises step (S221), of selecting, a plurality of carbon nanotube segments with a certain width from the super-aligned carbon nanotube array; and step (S222), of stretching, the plurality of carbon nanotube segments substantially perpendicularly to a growth direction of the super-aligned carbon nanotube array at a certain speed, to obtain the super-aligned carbon nanotube film, and directly laying the super-aligned carbon nanotube film on the first surface 100 without any other steps of treating the super-aligned carbon nanotube film.

The carbon nanotube structure 30 may comprise at least two super-aligned carbon nanotube films. The step (S22) further comprises step (S223) of laying, at least one super-aligned carbon nanotube film on the super-aligned carbon nanotube film obtained in step (S222), and overlapping the at least one super-aligned carbon nanotube film in parallel to the super-aligned carbon nanotube film in step (S222).

In one embodiment, the method of laying the carbon nanotube structure 30 on the first surface 100 comprises providing a support structure and drawing at least one super-aligned carbon nanotube film from the super-aligned carbon nanotube array. The at least one super-aligned carbon nanotube film is laid on the support structure, to form the carbon nanotube structure 30 and transferring the carbon nanotube structure 30 from the support structure to the first surface 100. The support structure can be a substrate or a frame structure. In one embodiment, the support structure is the frame structure, the carbon nanotube structure 30 is partially suspended to form a suspended portion. The transferring of the carbon nanotube structure 30 from the support structure to the first surface 100 comprises directly placing the suspended portion on the first surface 100 and then removing the frame structure.

The plurality of carbon nanotubes of the super-aligned carbon nanotube array are pure. In one embodiment, a length of each of the plurality of carbon nanotubes in the super-aligned carbon nanotube array is longer than 300 micrometers.

A method for making the super-aligned carbon nanotube array can be a chemical vapor deposition (CVD) method, an arc discharge preparation method, or an aerosol preparation method. In one embodiment, the super-aligned carbon nanotube array is obtained by the chemical vapor deposition (CVD) method. The chemical vapor deposition (CVD) method comprises the steps of (a) providing a substrate, in which the substrate can be selected from the group consisting of a P-type silicon substrate, an N-type silicon substrate, and a silicon substrate formed with an oxide layer. Then (b) forming a catalyst layer on a surface of the substrate, in which a material of the catalyst layer can be selected from the group consisting of iron (Fe), cobalt (Co), nickel (Ni) and alloy of any combination thereof. Step (c) is annealing the substrate with the catalyst layer in air at 700° C. to 900° C. for about 30 minutes to 90 minutes and (d) disposing the substrate in a reaction chamber. The reaction chamber is heated in protective gas to 500° C.~740° C., and a carbon source gas is introduced into the reaction chamber for about 5 minutes to about 30 minutes. The super-aligned carbon nanotube array is grown from the substrate. A height of the carbon nanotube of the super-aligned carbon nanotube array is ranged from about 200 micrometers to about 400 micrometers. The carbon source gas can be chemically active hydrocarbons, such as acetylene. The protective gas can be nitrogen, ammonia, or an inert gas.

In one embodiment, in step (S2), after drawing the super-aligned carbon nanotube film from the super-aligned carbon nanotube array and before directly laying the super-aligned carbon nanotube film on the first surface 100, the super-aligned carbon nanotube film is stretched along the extending direction of the plurality of carbon nanotubes of the super-aligned carbon nanotube film. In some embodiments, a length of the stretching is from about 1 millimeter to about 3 millimeters. In one embodiment, the stretch length is about 3 millimeters. The step of stretching the super-aligned carbon nanotube film can make the extension directions of the randomly aligned carbon nanotubes consistent with the extension direction of the majority of the carbon nanotubes in the super-aligned carbon nanotube film, thereby smoothing the surface of the super-aligned carbon nanotube film.

Figure 7:
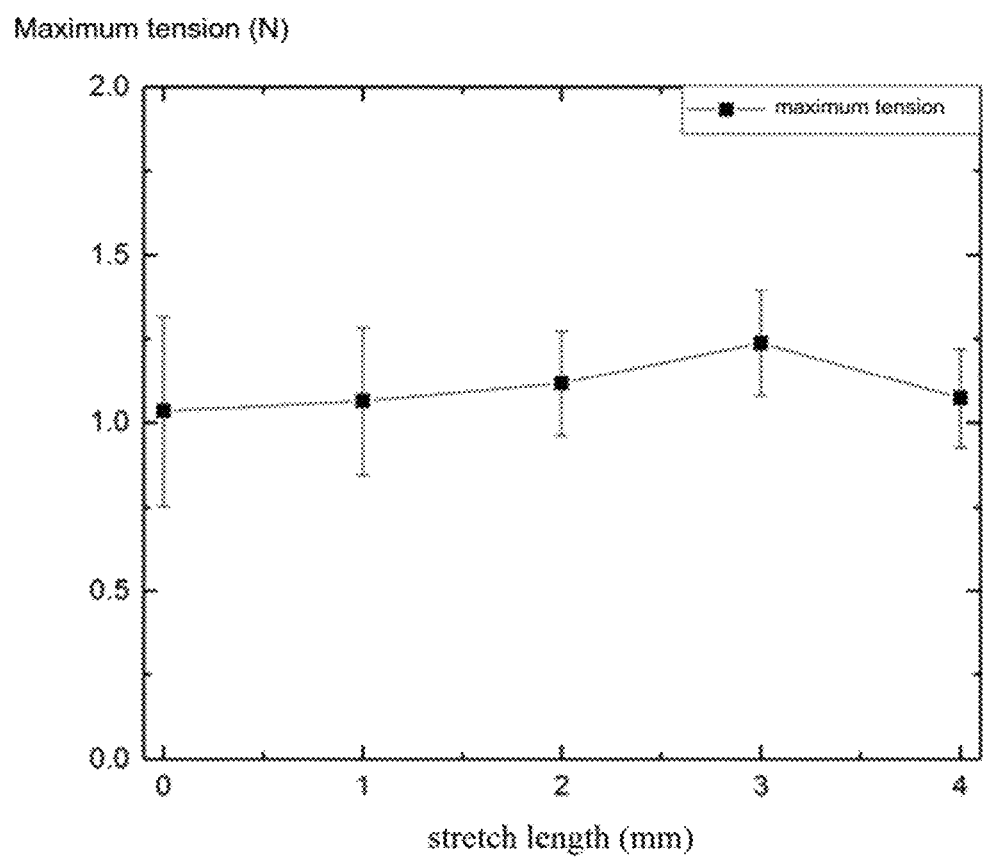
FIG. 7 shows a changing curve of surface tension of silicon wafers with a changing stretch length of the carbon nanotube structure.

Referring to FIG. 7, different carbon nanotube structures are used to bond two square silicon wafers with a side length of 7 mm. Each of the different carbon nanotube structures comprises ten super-aligned carbon nanotube films. Different carbon nanotube structures have different stretch lengths. A length of each of the different carbon nanotube structures before stretching is 174 mm. When the stretch length is less than 3 mm, that is when a percentage of the stretch length and the length of each of the different carbon nanotube structures before stretching is less than 0.57, an adhesion between the two square silicon wafers increases with the increase of the stretch length. When the stretch length is larger than 3 mm, that is when a percentage of the stretch length and the length of each of the different carbon nanotube structures before stretching is larger than 0.57, an adhesion between the two square silicon wafers decreases with the increase of the stretch length.

The number of the super-aligned carbon nanotube films of the carbon nanotube structure 30 can be selected according to actual needs. In one embodiment, the carbon nanotube structure 30 comprises 5 to 30 layers of the super-aligned carbon nanotube films overlapped and paralleled with each other. In one embodiment, the carbon nanotube structure 30 comprises 10 to 15 layers of the super-aligned carbon nanotube films overlapped and paralleled with each other. In another embodiment, the carbon nanotube structure 30 comprises 10 layers of the super-aligned carbon nanotube films overlapped and paralleled with each other.

Figure 8:
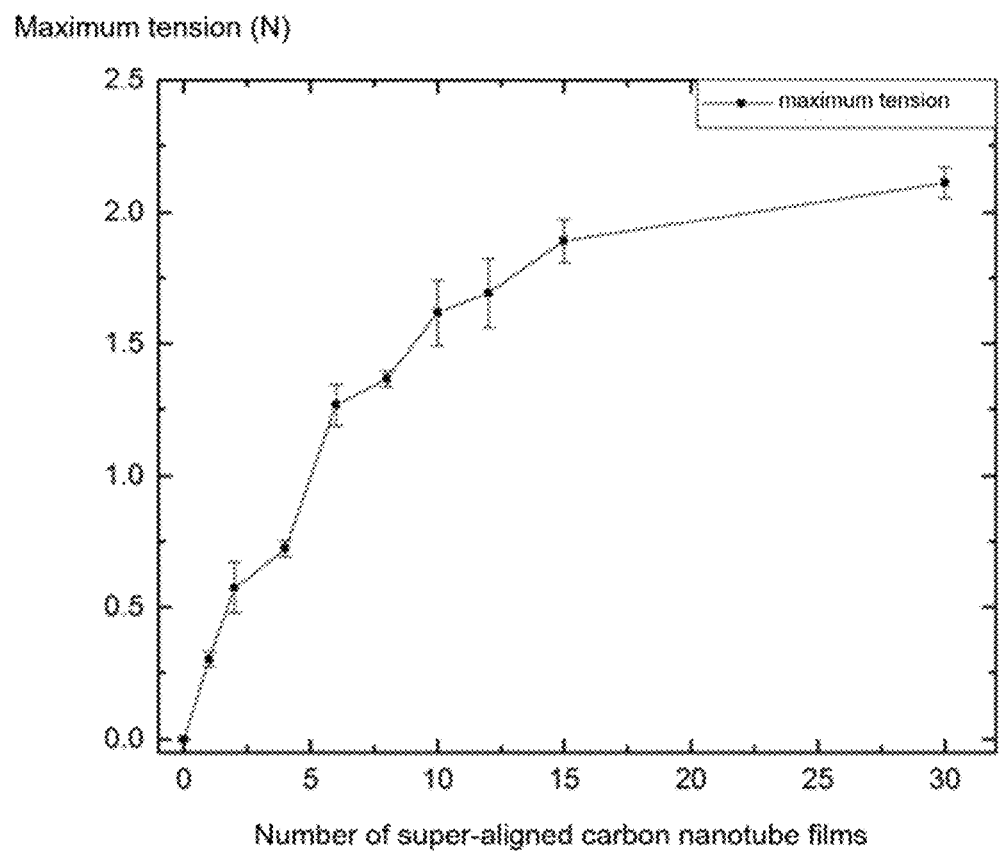
FIG. 8 shows a changing curve of surface tension of silicon wafers with changing the number of super-aligned carbon nanotube layers in a carbon nanotube structure.

Referring to FIG. 8, different double-sided tapes comprising different numbers of super-aligned carbon nanotube films are used to bond two square silicon wafers with a side length of 7 mm and test results are shown. When there is no super-aligned carbon nanotube film between the two square silicon wafers, the two square silicon wafers have no adhesion at all. As the number of the super-aligned carbon nanotube films in the carbon nanotube structure 10 increases, the adhesion between the two square silicon wafers increases. When the number of the super-aligned carbon nanotube films of the carbon nanotube structure 30 is greater than 15 layers, an increase rate of the adhesion between the two square silicon wafers decreases with the increase in the number of the super-aligned carbon nanotube films.

In step (S4), a magnitude of the pressure is selected according to the volume of the first object 10 and the second object 20, the area of the first surface 100 and the second surface 200, and the like. In one embodiment, the amount of the pressure ranges from about 10 $N/cm^2$ to 20 $N/cm^2$. In one embodiment, the amount of the pressure is about 20 $N/cm^2$.

Figure 9:
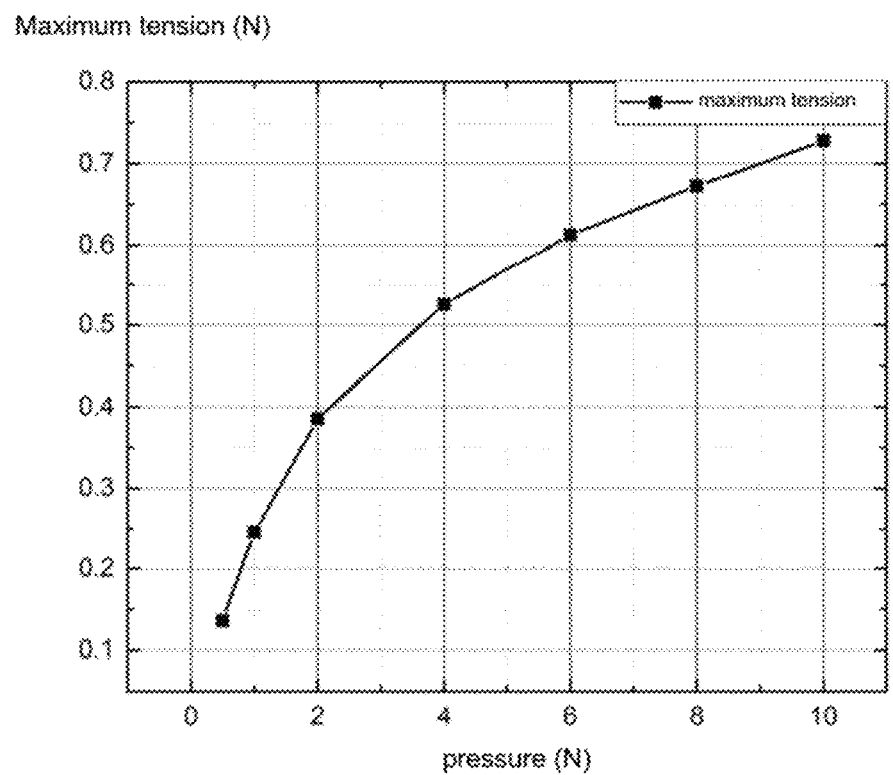
FIG. 9 shows a changing curve of surface tension of silicon wafers with changing a pressure on the silicon wafers.

Referring to FIG. 9, the carbon nanotube structure comprising ten super-aligned carbon nanotube films is used to bond two square silicon wafers with a side length of 7 mm and test results are shown. The adhesion between the two square silicon wafers increases with the magnitude of pressure applied.

In one embodiment, after step (S4), further comprises step (S5) cooling the three-layer structure to about −196° C.~−100° C.

In one embodiment, after step (S4), further comprises step (S5) heating the three-layer structure to about 800° C.~1000° C.

In one embodiment, the carbon nanotube structure 30 includes at least one super-aligned carbon nanotube film, and the super-aligned carbon nanotube film consists of a plurality of carbon nanotubes. The plurality of carbon nanotubes extend substantially along a same direction and are joined end-to-end by van der Waals force.

In one embodiment, the carbon nanotube structure 30 includes a plurality of carbon nanotubes. The plurality of carbon nanotubes are joined end-to-end by van der Waals force and extends substantially along a same direction. An extending direction of the plurality of carbon nanotubes is parallel to a length direction of the carbon nanotube structure 30. The plurality of carbon nanotubes can be pure carbon nanotubes. The pure carbon nanotubes mean that carbon nanotubes are not modified by physical or chemical processes, there being few or no impurities adhered on surface of the carbon nanotubes, and a purity of the carbon nanotubes is better than or equal to 99.9%.

Figure 10:
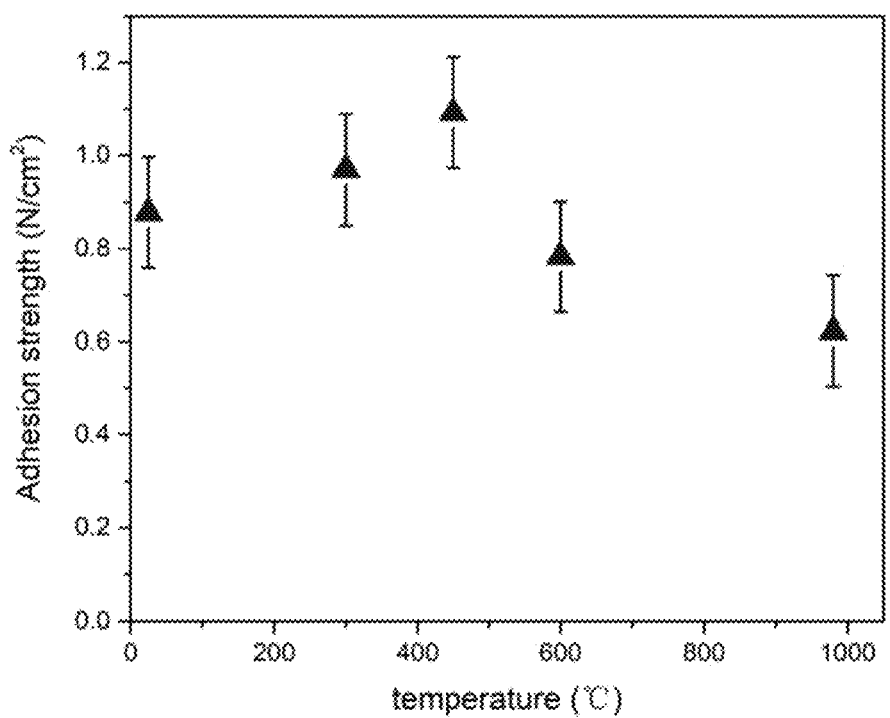
FIG. 10 shows a changing curve of adhesion strength of two objects with changing a temperature.

The carbon nanotube structure 30 bonds the first object 10 and the second object 20 together only by van der Waals force. Van der Waals force is little affected by temperature, the carbon nanotube structure 30 used in the bonding method still has excellent viscosity at high and low temperatures. Furthermore, the absence or almost complete absence of impurities adhered on surfaces of the plurality of carbon nanotubes of the carbon nanotube structure 30, such as amorphous carbon or residual catalyst metal particles, gives high thermal stability to the carbon nanotube structure 30. The carbon nanotube structure 30 does not readily oxidized even at a high temperature. Therefore, the bonding method can be implemented at high and low temperatures. In one embodiment, the bonding method is performed at a temperature from about −196° C. to about 1000° C. Referring to FIG. 10, the adhesion strength between the first object 10 and the second object 20 bonded by the bonding method minor changes with changing the temperature. In one embodiment, the bonding method is performed at a temperature from about −196° C. to about −100° C. In another embodiment, the bonding method is performed at a temperature from about 800° C. to about 1000° C.

In the bonding method, the carbon nanotube structure 30 bonds the first object 10 and the second object 20 together only by van der Waals force. When the first object 10 and the second object 20 need to be separated, only a small force, without heating or dissolving with solvent, is required. The carbon nanotube structure 30 can be removed from the first surface 100 and the second surface 200 without causing damage to the first surface 100 and the second surface 200 during or after the separation. A position for bonding can be adjusted in the bonding method.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A bonding method comprising:
providing a first object comprising a first surface and a second object comprising a second surface, wherein both the first surface and the second surface have a surface roughness less than or equal to 1.0 micrometer;
laying a carbon nanotube structure on and in direct contact with the first surface, wherein the carbon nanotube structure comprises a super-aligned carbon nanotube film, the super-aligned carbon nanotube film comprises a plurality of carbon nanotubes, the plurality of carbon nanotubes extends substantially along a same direction, and an extending direction of the plurality of carbon nanotubes is substantially parallel to a surface of the super-aligned carbon nanotube film, the first surface and the second surface;
laying the second object on and in direct contact with the carbon nanotube structure, wherein the carbon nanotube structure is located between the first object and the second object; and
applying a pressure to the first object and the second object, to bond the first object to the second object, wherein a three-layer structure is formed by the first object, the carbon nanotube structure and the second object.

2. The bonding method of claim 1, wherein the laying the carbon nanotube structure on and in direct contact with the first surface comprises:
providing a super-aligned carbon nanotube array;
drawing the super-aligned carbon nanotube film from the super-aligned carbon nanotube array; and
directly laying the super-aligned carbon nanotube film on the first surface.

3. The bonding method of claim 2, wherein the laying the carbon nanotube structure on and in direct contact with the first surface further comprises:
stretching the super-aligned carbon nanotube film along the extend direction of the plurality of carbon nanotubes of the super-aligned carbon nanotube film after drawing the super-aligned carbon nanotube film from the super-aligned carbon nanotube array and before directly laying the super-aligned carbon nanotube film on the first surface.

4. The bonding method of claim 3, wherein a stretch length of stretching the super-aligned carbon nanotube film along the extend direction of the plurality of carbon nanotubes of the super-aligned carbon nanotube film is from about 1 millimeter to about 3 millimeters.

5. The bonding method of claim 1, wherein the laying the carbon nanotube structure on and in direct contact with the first surface comprises:
drawing at least one super-aligned carbon nanotube film from a super-aligned carbon nanotube array;
laying the at least one super-aligned carbon nanotube film on a support structure, to form the carbon nanotube structure; and
transferring the carbon nanotube structure from the support structure to the first surface.

6. The bonding method of claim 5, wherein the support structure is a frame structure, the carbon nanotube structure is partially suspended to form a suspended portion; and the transferring the carbon nanotube structure from the support structure to the first surface comprises directly placing the suspended portion on the first surface; and then removing the frame structure.

7. The bonding method of claim 1, further comprising cooling the three-layer structure to about −196° C.~−100° C.

8. The bonding method of claim 1, further comprising heating the three-layer structure to about 800° C.~1000° C.

9. The bonding method of claim 1, wherein the bonding method is performed at a temperature from about −196° C. to about 1000° C.

10. The bonding method of claim 9, wherein the bonding method is performed at the temperature from about −196° C. to about −100° C.

11. The bonding method of claim 9, wherein the bonding method is performed at the temperature from about 800° C. to about 1000° C.

12. The bonding method of claim 1, wherein the surface roughness of the first surface and the second surface are both less than or equal to 100 nanometers.

13. The bonding method of claim 1, wherein the plurality of carbon nanotubes are pure carbon nanotubes.

14. The bonding method of claim 1, wherein the carbon nanotube structure comprises 10~15 layers of the super-aligned carbon nanotube films overlapped and paralleled with each other.

15. A bonding method comprising:
providing a first object comprising a first surface and a second object comprising a second surface, wherein both the first surface and the second surface have a surface roughness less than or equal to 1.0 micrometer;
sandwiching a carbon nanotube structure between the first object and the second object, and in direct contact with the first surface and the second surface, wherein the carbon nanotube structure consists of a super-aligned carbon nanotube film, the super-aligned carbon nanotube film consists of a plurality of carbon nanotubes, the plurality of carbon nanotubes extends substantially along a same direction, and an extending direction of the plurality of carbon nanotubes is substantially parallel to a surface of the super-aligned carbon nanotube film, the first surface and the second surface; and
applying a pressure to the first object and the second object, to bond the first object to the second object, wherein a three-layer structure is formed by the first object, the carbon nanotube structure and the second object.

16. The bonding method of claim 15, wherein the three-layer structure is free of organic solvent.

17. The bonding method of claim 15, further comprising cooling the three-layer structure to about −196° C.∼−100° C.

18. The bonding method of claim 15, further comprising heating the three-layer structure to about 800° C.∼1000° C.

19. The bonding method of claim 15, wherein the bonding method is performed at a temperature from about −196° C. to about −100° C.

20. The bonding method of claim 15, wherein the bonding method is performed at a temperature from about 800° C. to about 1000° C.

* * * * *